United States Patent
Houdek et al.

(10) Patent No.: US 10,906,418 B2
(45) Date of Patent: Feb. 2, 2021

(54) APPARATUS FOR CHARGING A PLURALITY OF ELECTRIC VEHICLES

(71) Applicant: Dr. Ing, h.c. F. Porsche Aktiengesellschaft, Stuttgart (DE)

(72) Inventors: Pavel Houdek, Czech Republic (CZ); Stefan Götz, Forstern (DE); Manuel Groß, Hessigheim (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 16/015,341

(22) Filed: Jun. 22, 2018

(65) Prior Publication Data

US 2018/0370375 A1 Dec. 27, 2018

(30) Foreign Application Priority Data

Jun. 23, 2017 (DE) .................. 10 2017 113 964

(51) Int. Cl.
*B60L 53/302* (2019.01)
*B60L 11/18* (2006.01)
*B60L 53/31* (2019.01)

(52) U.S. Cl.
CPC ......... *B60L 53/302* (2019.02); *B60L 11/1825* (2013.01); *B60L 53/31* (2019.02); *Y02T 10/70* (2013.01); *Y02T 10/7072* (2013.01); *Y02T 90/12* (2013.01)

(58) Field of Classification Search
CPC .... B60L 11/1825; B60L 53/31; B60L 53/302; Y02T 10/70; Y02T 10/7072; Y02T 90/12
See application file for complete search history.

(56) References Cited

U.S. PATENT DOCUMENTS

| | | | | |
|---|---|---|---|---|
| 2008/0148732 A1* | 6/2008 | Fein | ................. | F03D 9/46 60/641.3 |
| 2009/0121488 A1* | 5/2009 | Bhatti | ................ | F01K 9/003 290/54 |
| 2009/0192042 A1* | 7/2009 | Kim | ................ | H01B 12/16 505/230 |
| 2010/0301596 A1* | 12/2010 | Amann | ................ | F16L 37/0985 285/31 |

(Continued)

FOREIGN PATENT DOCUMENTS

| CN | 205228242 U | 5/2016 |
|---|---|---|
| CN | 205791650 U | 12/2016 |

(Continued)

OTHER PUBLICATIONS

Chinese Office Action for Chinese Application No. 201810628454. 1, dated Nov. 14, 2019, 6 pages.

(Continued)

*Primary Examiner* — Richard Isla
*Assistant Examiner* — Johali A Torres Ruiz
(74) *Attorney, Agent, or Firm* — RatnerPrestia

(57) ABSTRACT

An apparatus for charging a plurality of electric vehicles, wherein the apparatus has a charging module, wherein the charging module is operatively connected to a cooling component, wherein the cooling component is designed in such a way that, for the purpose of carrying away the waste heat from the charging module, a medium which carries along the waste heat is transported through a line which is routed in the ground.

11 Claims, 1 Drawing Sheet

(56) References Cited

U.S. PATENT DOCUMENTS

| | | | | |
|---|---|---|---|---|
| 2013/0029193 A1* | 1/2013 | Dyer | ...................... | B60L 53/14 |
| | | | | 429/62 |
| 2013/0307477 A1* | 11/2013 | Reinschke | .......... | B60L 11/1824 |
| | | | | 320/109 |
| 2014/0124164 A1* | 5/2014 | Campbell | ........... | F28D 15/0275 |
| | | | | 165/45 |
| 2014/0311174 A1* | 10/2014 | Wiggs | ..................... | F24T 10/15 |
| | | | | 62/260 |
| 2015/0047619 A1* | 2/2015 | Fetzer | .................... | F02M 26/29 |
| | | | | 123/568.12 |
| 2018/0229616 A1* | 8/2018 | Rhodes | ..................... | F24D 7/00 |
| 2018/0229620 A1* | 8/2018 | Yamanaka | .............. | B60L 58/27 |
| 2018/0331401 A1* | 11/2018 | Glass | ................... | B60L 3/0046 |

FOREIGN PATENT DOCUMENTS

| | | | |
|---|---|---|---|
| DE | 7604366 | U1 | 7/1979 |
| WO | 2010036670 | A2 | 4/2010 |
| WO | 2014147491 | A1 | 9/2014 |

OTHER PUBLICATIONS

German Search Report for German Application No. 10 2017 113 964.8, dated Aug. 3, 2020, with partial translation, 8 pages.
Chinese Office Action for Chinese Application No. 201810628454.1, dated Aug. 4, 2020, 8 pages.

\* cited by examiner

APPARATUS FOR CHARGING A PLURALITY OF ELECTRIC VEHICLES

CROSS-REFERENCE TO RELATED APPLICATION

This application claims priority to German Patent Application No. DE 10 2017 113 964.8 filed Jun. 23, 2017, which is incorporated by reference herein in its entirety.

FIELD OF THE INVENTION

The present invention relates to an apparatus for charging a plurality of electric vehicles, wherein the apparatus has a charging module, wherein the charging module is operatively connected to a cooling component.

BACKGROUND OF THE INVENTION

Apparatuses for changing the batteries of electric vehicles are known from the prior art. An important parameter of the charging process in this case is the time which is required in order to transmit electrical energy to the vehicle. Reducing this time is generally associated with relatively high current densities which, for example on account of resistive losses in the current-carrying parts or the heat of reaction of the electrochemical processes in the battery, lead to heating of the corresponding components and, under certain circumstances, necessitate a cooling mechanism. To this end, cooling systems in which a flowing liquid absorbs heat owing to coupling to the heated components and transports the said heat away are known from the prior art. It is then necessary to dissipate the heat which has been carried away from the charging station either to a reservoir of lower temperature or to draw the said heat from the liquid by way of a cyclical cooling process.

SUMMARY OF THE INVENTION

An object of the present invention is to provide an apparatus by way of which this cooling process can be realized in, an efficient and economical manner.

This object is achieved by an apparatus for charging a plurality of electric vehicles, wherein the apparatus has a charging module, wherein the charging module is operatively connected to a cooling component, wherein the cooling component is designed in such a way that, for the purpose of carrying away the waste heat from the charging module, a medium which carries along the waste heat is transported through a line which is routed in the ground.

Owing to this apparatus, it is possible to use the ground as a naturally present is temperature reservoir in order to either completely dissipate the waste heat or to reduce the energy costs of a downstream cooling installation by virtue of precooling. The invention can be integrated into existing structures as a simple modification. To this end, it is sufficient to lay the return line for the coolant at least partially in the ground.

The basic prerequisite for this use, specifically that the ground is at a lower temperature than the medium to be cooled, is generally met in this case, wherein the temperature gradient can also be achieved or increased by the lines being laid in deeper layers in the ground.

In one preferred embodiment of the present invention, a metal pipe is used as the line for the medium which transports the waste heat. Here, the high thermal conductivity of metal materials promotes rapid transportation of heat between the medium and the ground.

In a further preferred embodiment of the present invention, a plastic pipe is used as the line for the medium which transports the waste heat. Plastic pipes are distinguished here on account of low costs, low weight, a high degree of resistance and good processability.

In a further preferred embodiment of the present invention, the line has ribs by way of which the contact area with the ground is increased. Since heat is transferred between the line and the ground at the contact area, the dissipation of heat is aided by this refinement.

In a further preferred embodiment, the line is laid in the ground in a meandering manner, firstly in order to provide, owing to the greater length of the line, an associated larger contact area between the line and the ground and secondly in order to utilize larger region of the ground for cooling purposes.

In a further preferred embodiment, the line is completely or partially provided with a sheathing, for example in the form of sleeves or clamps. This has the advantage that the flow of heat between the coolant line and the ground can be increased independently of the rest of the configuration of the line as a result. For this purpose, the sheathing should have a higher thermal conductivity than the ground, so that the heat is efficiently dissipated through the casing to the outer circumference of the casing, which is larger than the line circumference, and there is transported away into the ground to a greater extent on account of the larger contact area.

If the line is only partially surrounded by a sheathing, this allows more economical use of material and furthermore enables said sheathing to be retrofitted to existing lines in a simple and advantageous manner.

In a further preferred embodiment, the line is only partially sheathed, for example in the form of sleeves or clamps. In this case, the sheathed segments are arranged at regular intervals in order to provide uniform cooling over the entire length of the pipe.

In a further preferred embodiment, the sheathed segments are fitted such that the distances between them increase as the distance from the charging module grows or only the initial section of the line is provided with sheathings. Since the temperature of the medium continuously decreases as it is transported through the ground, it is therefore ensured that the transfer of heat to the ground is aided in locations where the highest temperature prevails. Therefore, for example, an undesirably high temperature in the initial section can be effectively cooled down. If an existing line is subsequently equipped with a sheathing, it is also possible to reduce the technical complexity and, in the process, to improve the outflow of heat in a targeted manner at the point at which the temperature is highest by virtue of restricting the said sheathing to the initial section.

In a further preferred embodiment, the sheathed segments are fitted such that the distances between them decrease as the distance from the charging module grows. Since the flow of heat between the line and the ground becomes weaker and weaker the lower the temperature difference between the said line and the ground, the discharge of heat in the region in which the temperature difference has already dropped to a considerable extent can therefore be improved in a targeted manner.

BRIEF DESCRIPTION OF THE DRAWINGS

Further details, features and advantages of the invention can be gathered from the drawings and also from the following description of preferred embodiments with reference to the drawings. Here, the drawings illustrate only exemplary embodiments of the invention which do not restrict the concept of the invention.

DETAILED DESCRIPTION OF THE INVENTION

Figure 1:
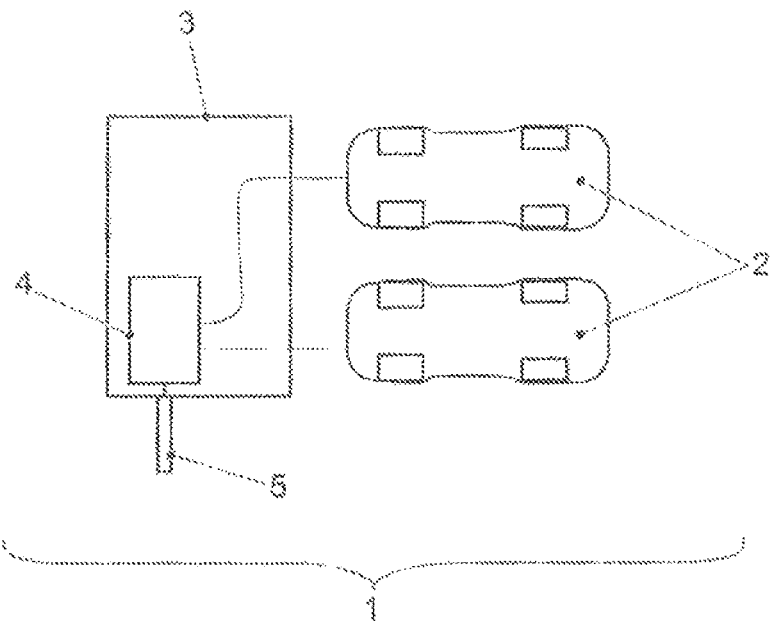
FIG. 1 schematically illustrates an apparatus for charging a plurality of electric vehicles according to one embodiment of the present invention.

FIG. 1 shows an apparatus 1 for charging electric vehicles 2 according to one embodiment of the present invention. Here, the charging module 3, which transmits electrical energy to the vehicles, is connected to a cooling component 4 which transfers the heat to a liquid medium which is then transported away through the line 5.

Figure 2:
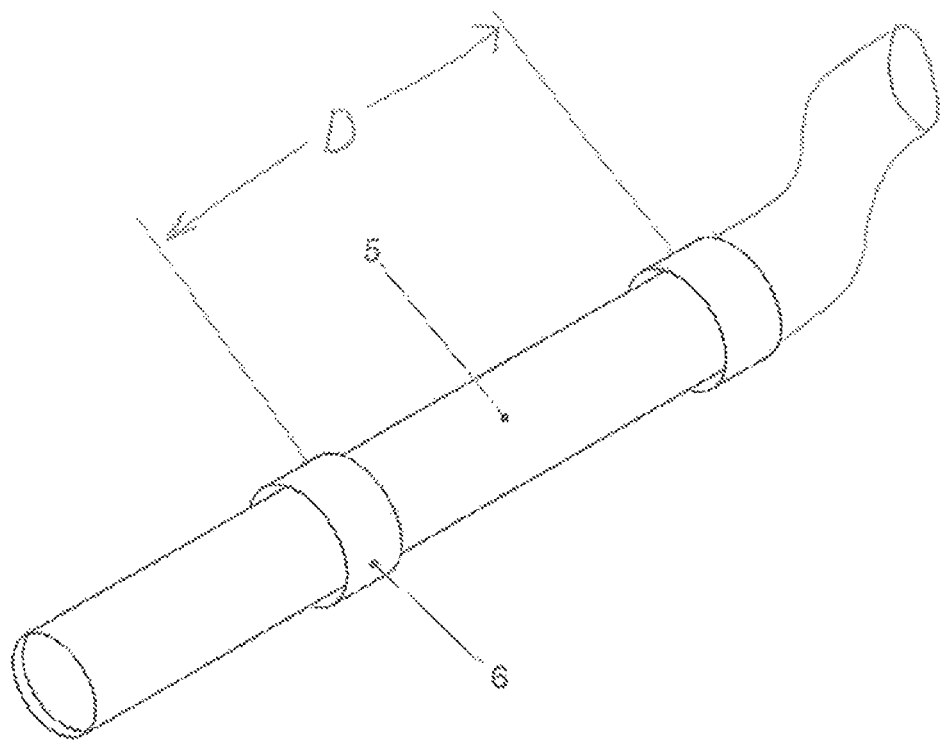
FIG. 2 schematically illustrates a line which is laid in the ground and through which a liquid medium transports the waste heat away from the charging station.

FIG. 2 shows a coolant line 5 according to one embodiment of the present invention. In this case, the line 5 can preferably be composed of metal, so that the heat is efficiently transported from the inside radius to the outside radius of the pipe 5 owing to the high thermal conductivity of the metal. This results in a flat temperature profile in the pipe cross section, so that the external radius has a similar temperature to the flowing medium itself. The resulting temperature difference between the outer surface of the pipe 5 and the ground generates the thermodynamic force which drives the flow of heat, so that a high temperature difference causes a relatively high flow of heat at the contact area between the pipe 5 and the ground.

However, if the pipe 5 is manufactured from a material with a lower thermal conductivity, the external radius has a lower temperature than the medium and therefore a lower temperature difference between the pipe 5 and the ground, as a result of which the flow of heat is reduced. Nevertheless, other considerations can suggest a non-metallic material. For reasons of cost, reasons of processability or owing to the high degree of resistance to chemical influences and corrosion, the said materials can is include, in particular, plastics in which the usually low thermal conductivity can be compensated for by other favourable material properties.

The described effect that a material of high thermal conductivity influences the flow of heat between the contact area between the medium and the pipe and the contact area is between the pipe and the ground such that the latter contact area is at as high a temperature as possible can also be utilized by fitting a complete or partial sheathing 6. In this case, the outer surface of the casing 6 represents an effective increase in the size of the pipe area. Since the flow of heat takes place at the contact area to the ground, an increase in the size of the contact area in this way promotes the transfer of heat to the ground.

This advantage can be utilized, together with a low level of expenditure on material, by virtue of the line 5 being sheathed only in segments, for example in the form of sleeves or clamps 6 which are fitted to the pipe 5, instead of complete sheathing. These promote the outflow of heat to the ground at specific points of the line 5, wherein selection of these points can depend on additional considerations. Therefore, for example, the sleeves 6 can be fitted only in the initial section of the coolant line 5 or at intervals which increase in size as the distance from the charging module 3 grows. As a result, cooling is improved in a targeted manner in that section in which the coolant is at the highest temperature. Undesirably high temperatures of the line 5 can be captured in this way.

Conversely, the sleeves or clamps 6 can be fitted such that the distances "D" between them decrease as the distance from the charging module 3 grows. The flow of heat between the pipe 5 and the ground is determined substantially by the temperature difference between the said pipe and the ground, so that the cooler sections of the line 5 are subject to reduced outflow of heat. Owing to the clamps 6 being fitted more densely in these sections, the outflow of heat there can be improved in a targeted manner. The ribs of the line 5 may also be designated by item numeral 6.

What is claimed is:

1. Apparatus for charging a plurality of electric vehicles, wherein the apparatus comprises:
   a charging module; and
   a cooling component operatively connected to the charging module,
   a charging line extending from and connected to the cooling component, the charging line being configured to be connected to one of the electric vehicles for charging the electric vehicles,
   a cooling line having a first end that is connected to the cooling component, a second end that is configured to be routed in the ground, and a hollow fluid-carrying passage extending between the first and second ends, wherein neither the first end nor the second end of the cooling line is configured to be connected to the plurality of electric vehicles,
   the cooling component being configured to (i) receive waste heat via a medium in said charging line, and (ii) deliver the waste heat to a liquid medium contained in the cooling line, which is routed in the ground, such that the cooling line transfers the waste heat into the ground as a result of surface contact between the cooling line and the ground.

2. Apparatus according to claim 1, wherein the cooling line is a plastic pipe.

3. Apparatus according to claim 1, wherein the cooling line is a metal pipe.

4. Apparatus according to claim 1, wherein the cooling line has ribs.

5. Apparatus according to claim 1, wherein the cooling line is laid in a meandering manner in the ground.

6. Apparatus according to claim 1, wherein the cooling line is at least partially surrounded by one or more sheathings.

7. Apparatus according to claim 6, wherein the one or more sheathings which at least partially surrounds the cooling line include at least two sheathings fitted at regular intervals.

8. Apparatus according to claim 6, wherein the one or more sheathings include at least two sheathings and wherein the distances between the sheathings which at least partially surround the cooling line increase as the distance from the charging module increases.

9. Apparatus according to claim 6, wherein the one or more sheathings include at least two sheathings and wherein the distances between the sheathings which at least partially surround the cooling line decrease as the distance from the charging module increases.

10. Apparatus according to claim 1, wherein the cooling line is not directly connected to the plurality of electric vehicles.

11. Apparatus according to claim 1, wherein the cooling line and the charging line are separate lines that are interconnected via the cooling component.

\* \* \* \* \*